United States Patent [19]
Scofield

[11] Patent Number: 5,944,472
[45] Date of Patent: Aug. 31, 1999

[54] MOTOR DRIVEN TRAILER UNLOADER

[76] Inventor: Scot P. Scofield, 7919 Trout Rd., New Orleans, La. 70126

[21] Appl. No.: 09/012,758

[22] Filed: Jan. 23, 1998

[51] Int. Cl.[6] ........................................................ B65F 3/28
[52] U.S. Cl. .......................... 414/509; 414/521; 414/492
[58] Field of Search .................................... 414/509, 511, 414/512, 525.1, 521, 492

[56] References Cited

U.S. PATENT DOCUMENTS

| | | | |
|---|---|---|---|
| 1,567,690 | 12/1925 | Weaver | 414/511 |
| 2,002,993 | 7/1935 | Ehrick et al. | 414/509 |
| 2,166,846 | 7/1939 | McCalley | 414/509 |
| 2,643,014 | 6/1953 | Calcagno | 414/512 |
| 2,760,658 | 8/1956 | Smith | 414/509 |
| 2,810,486 | 10/1957 | Elton | 414/509 |
| 3,688,926 | 9/1972 | Stefanelli | 214/38 BA |
| 3,905,494 | 9/1975 | Yatagai et al. | 214/89 |
| 3,998,343 | 12/1976 | Fors | 214/518 |
| 4,111,318 | 9/1978 | Lutz | 214/83.22 |
| 4,309,141 | 1/1982 | Van Drie | 414/509 |
| 4,431,360 | 2/1984 | Maeno | 414/294 |
| 5,054,987 | 10/1991 | Thornton | 414/390 |
| 5,273,390 | 12/1993 | Crissman | 414/509 |

*Primary Examiner*—James W. Keenan
*Assistant Examiner*—Isobel A. Parker
*Attorney, Agent, or Firm*—David L. Ray

[57] ABSTRACT

A motorized unloading apparatus for unloading cargo from a container such as a trailer or the cargo container of a large truck. The apparatus of the invention includes two threaded rods which extend substantially the full length of the cargo container, a pusher plate extending across the width of the cargo container, the pusher plate being rotatably received on the threaded rods and driven along the length of the trailer as the threaded rods are rotated, and a motor to rotate the rods.

4 Claims, 3 Drawing Sheets

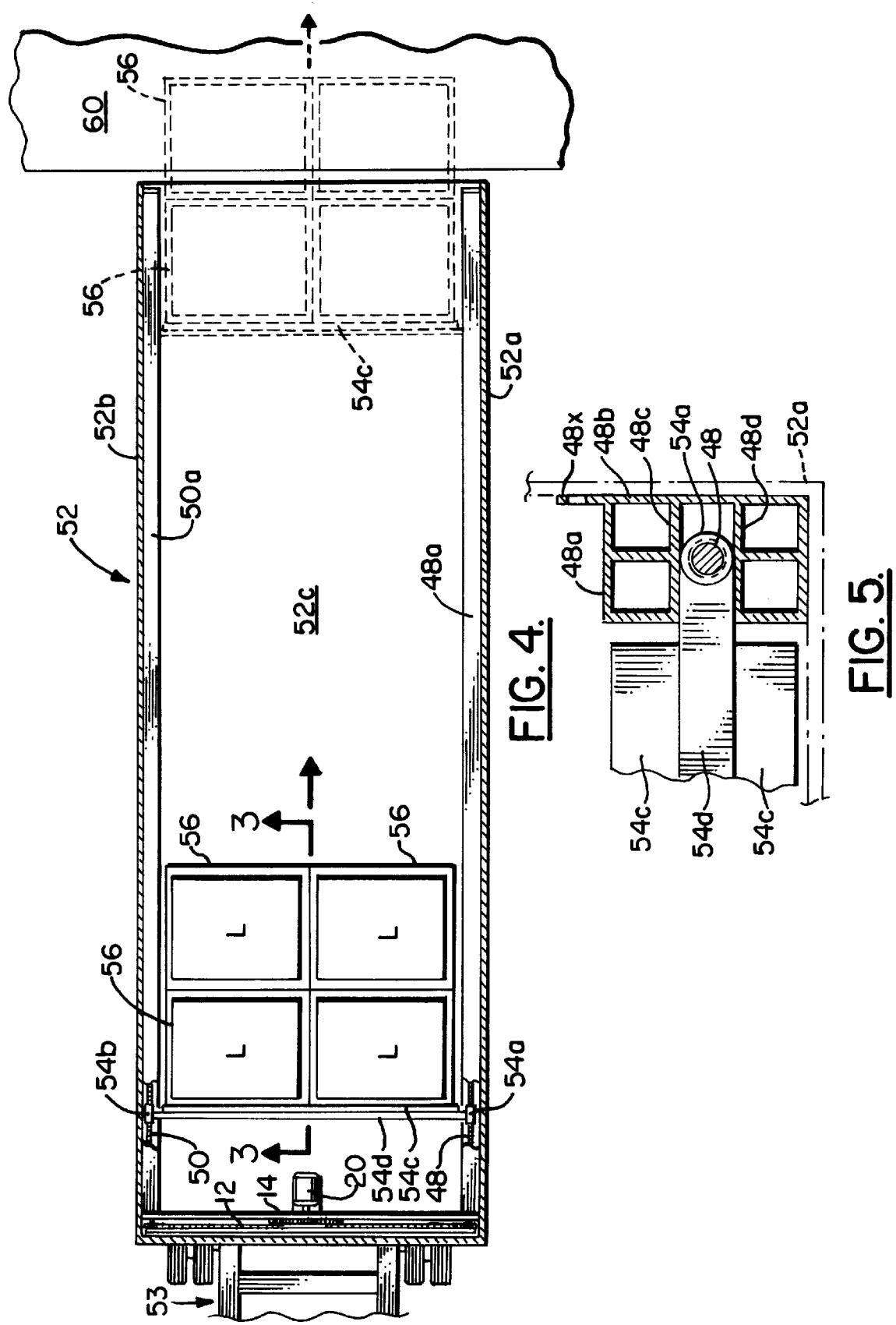

MOTOR DRIVEN TRAILER UNLOADER

BACKGROUND OF THE INVENTION

1. Field of the Invention

The present invention relates to cargo handling systems. In particular, the present invention relates to cargo handling systems for unloading cargo from a cargo container such as a tractor trailer or a large truck having a cargo container permanently connected thereto.

2. Description of the Related Art

Tractor-trailer rigs are well known in the art. Such rigs are sometimes referred to as "Eighteen Wheelers". The tractor is used to pull the trailer, and the trailer has a cargo carrying container built thereon. The tractor may be quickly disconnected from the trailer.

Other conventional trucks have the engine and the cargo carrying container connected permanently together. Such cargo carrying trucks are usually smaller than tractor-trailer rigs.

The unloading of such a cargo carrying container such as a trailer of a tractor trailer rig typically takes approximately 90 minutes. To unload the trailer or other cargo carrying container, commonly a conventional fork lift is driven onto the trailer and picks up the individual pieces of cargo in the trailer and transports them to the outside of the trailer. Commonly, the individual pieces of cargo are each connected to a pallet to enable the forks of the fork lift to be inserted under the pallet and lift the cargo up to remove the cargo from the trailer.

The truck driver who may be unloading the trailer must rely upon fork lift and the fork lift operator to unload the trailer unless the trailer contains smaller cargo which may be removed by the truck driver by hand or hand-truck.

Cargo handling systems are known in the art. Exemplary of the cargo handling systems of the prior art are those disclosed in the following U.S. Pat. Nos.: 3,688,926; 3,905,494; 3,998,343; 4,111,318; 4,431,360 and 5,054,987.

SUMMARY OF THE INVENTION

In accordance with the present invention there is provided a motorized unloading apparatus for unloading cargo from a container such as a trailer or the cargo container of a large truck. The apparatus of the invention includes two threaded rods which extend substantially the full length of the cargo container, a pusher plate extending across the width of the cargo container, the pusher plate being rotatably received on the threaded rods and driven along the length of the trailer as the threaded rods are rotated, and a motor to rotate the rods.

The present invention has the advantage of being connectable to the inside of a cargo container.

The present invention has the additional advantage of greatly reducing the amount of time necessary to unload trailer or a large truck.

The apparatus of the present invention has the further advantage of being light in weight.

The apparatus of the present invention has the advantage of enabling the truck driver to unload the truck or trailer when a fork lift is unavailable.

BRIEF DESCRIPTION OF THE DRAWINGS

FIG. 4 is a partly cross-sectional view taken along lines 4—4 of FIG. 2; and

FIG. 5 is a partly cut away, cross-sectional view taken along lines 5—5 of FIG. 1.

DESCRIPTION OF THE PREFERRED EMBODIMENTS

Figure 1:
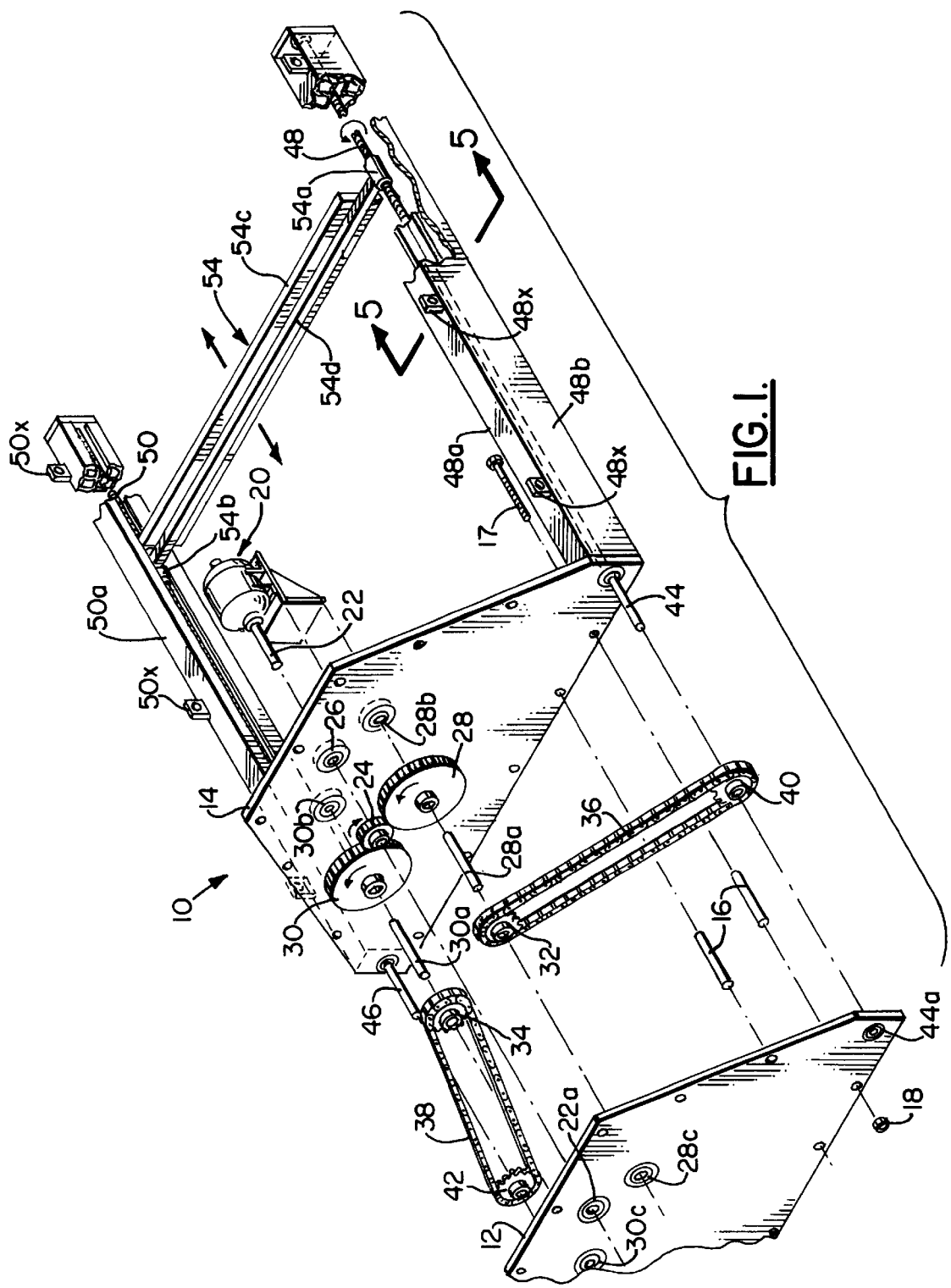
FIG. 1 is a partly cut-away, exploded, perspective view of the motor driven cargo unloading apparatus of the invention.

Referring now to the drawings, in FIG. 1 is shown the drive mechanism of the present invention generally indicated by the numeral 10. Drive mechanism 10 includes two spaced-apart vertically oriented parallel rigid support plates 12 and 14. Plates 12 and 14 are held apart by a plurality of hollow spacer cylinders 16 which receive bolts 17 therethrough each of which has a nut 18 threaded thereon—only two spacers 16—16 are shown in FIG. 1 although a spacer is used between each pair of aligned holes in plates 12 and 14.

An electric motor generally indicated by the numeral 20 is connected to plate 14. Motor 20 has a drive shaft 22 which is which has gear 24 rigidly connected thereto. Drive shaft 22 is rotatably received in bearing 26 which is connected to plate 14. Shaft 22 can rotate gear 24 in the direction indicated by the arrow adjacent to the gear 24, and motor 20 may be selectively run in the reverse direction to rotate gear 24 in the opposite direction as desired.

The end of shaft 22 opposite motor 20 is rotatably received in bearing 22a which is connected to plate 12. Gear 24 meshes with and drives gear 28 and gear 30. Gear 28 and gear 30 turn in the directions indicated by the arrow thereon when gear 24 is turning the in direction indicated by the arrow thereby.

Gear 28 and gear 30 are rigidly connected to on axles 28a and 30a, respectively. Axle 28a is rotatably received in bearing 28b connected to plate 14 and in bearing 28c connected to plate 12. Axle 30a is rotatably received in bearing 30b connected to plate 14 and in bearing 30c which is connected to plate 12.

Also rigidly connected to axles 28a and 30a are sprockets 32 and 34, respectively. Sprockets 32 and 34 drive chains 36 and 38, respectively.

Located at the lower end of chains 36 and 38 are sprockets 40 and 42, respectively. Sprockets 40 and 42 are rigidly connected to the smooth ends 44 and 46 of threaded rods 48 and 50, respectively. The end of the smooth end 44 of threaded rod 48 is rotatably received in bearing 44a connected to plate 12, the smooth end 46 of threaded rod 50 is received in an identical bearing connected to plate 12.

Threaded rods 48 and 50 are contained in casings 48a and 50a, respectively. Casing 48a and 50a are rigidly attached to the opposite inside walls 52a and 52b, respectively, of the cargo container generally indicated by the numeral 52 in FIG. 2. The cargo container 52 is a trailer which is shown connected to the tractor generally indicated by the numeral 53 in FIG. 2. Brackets 48b and 50b are used to bolt or connect casings 48a and 50a to the interior walls 52a and 52b of cargo container 52.

A pusher mechanism generally indicated by the numeral 54 in FIG. 1 is connected to threaded rods 48 and 50 by internally threaded cylinders 54a and 54b, respectively. Pusher mechanism 54 has a vertically oriented flat rectangular plate 54c connected to a longitudinal rod or bar 54d to which threaded cylinders 54a and 54b are rigid connected at opposite ends thereof.

As can be seen in FIG. 5, casing 48a has a vertical side plate 48b to which are rigidly connected horizontal plates 48c and 48d. Plates 48c and 48d form a continuous channel in which threaded cylinder 54a slides as rod 48 rotates. As can be seen in FIG. 1, casing 50a has a channel therein identical to the channel in casing 48a for receiving threaded cylinder 54b on the opposite end of bar 54d.

Figure 2:
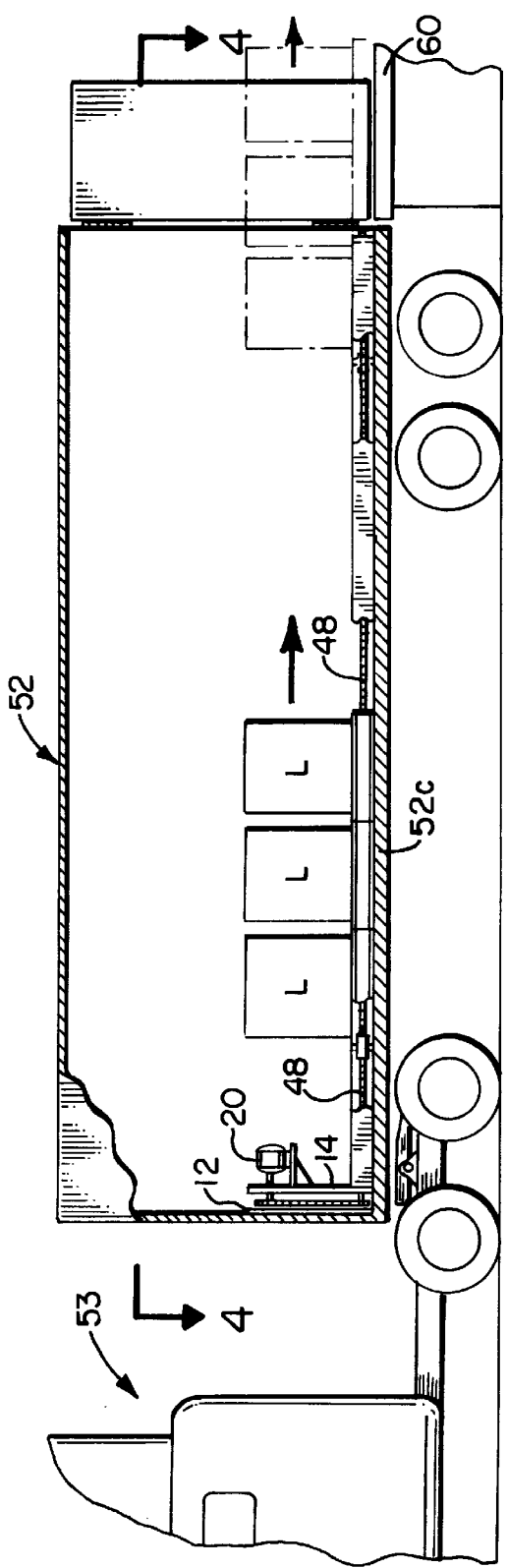
FIG. 2 is a partly cut-away, partly cross-sectional plan view of a tractor-trailer rig utilizing the apparatus of the invention.
Figure 3:
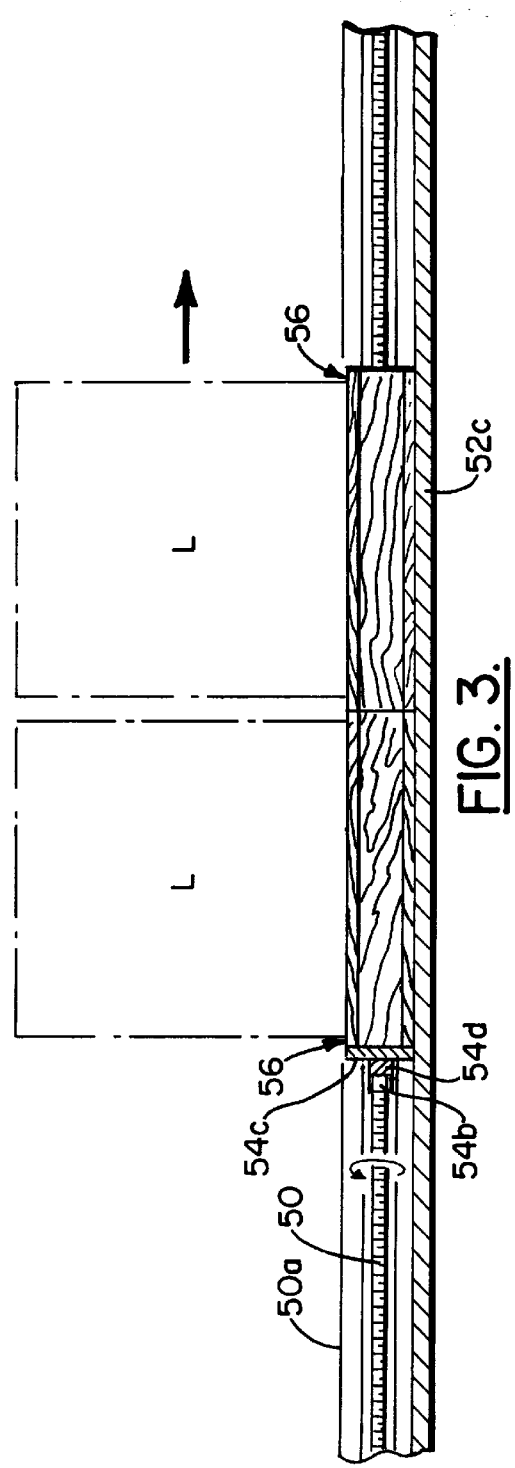
FIG. 3 is a partly cut-away, partly cross-sectional enlarged plan view taken along lines 3—3 of FIG. 4.

The apparatus of the present invention may be placed inside a cargo container 52 as shown in FIGS. 2–4, and casings 48a and 50a can be bolted to opposite walls 52a and 52b, respectively, of container 52 as shown in FIG. 4. The apparatus of the invention is then ready for unloading cargo from a cargo container.

To load cargo into the trailer, the cargo generally indicated by the letter "L" in FIGS. 2–4 is loaded onto pallets generally indicated by the numeral 56. Pallets 56 are conventional rigid pallets well known to the those skilled in the art. As can be seen in FIGS. 3 and 4, the cargo indicated by the letter L located on pallets 56 is placed on the floor 52c of cargo container 52 between casings 48a and 50a by a fork lift or the like. Pusher mechanism 54 is withdrawn to the position shown in FIG. 4 close to motor 20 to enable load cargo container 52 to be fully loaded.

As shown in FIGS. 2 and 3, to unload cargo L motor 20 is actuated by any conventional electronic controls (not shown) to rotate gear 24 to drive gears 28 and 30. Gears 28 and 30 drive chains 36 and 38, respectively, and chains 36 and 38 rotate gears 40 and 42, respectively, to drive threaded rods 48 and 50, respectively, in the direction necessary to drive pusher mechanism 54 toward the rear of the truck.

As pusher mechanism 54 moves toward the rear of trailer 52, pusher mechanism 54 contacts pallets 56 as shown in FIGS. 2 and 3 and forces them in the direction of the arrow as shown in FIGS. 2 and 3 onto to dock 60 adjacent to container 52. By continuing to operate motor 20, pusher mechanism 54 can be driven completely to the rear of the container 52, thereby forcing all of the pallets 56 and cargo L onto the surface of dock 60 to completely unload the cargo container.

When the cargo is completely unloaded, the motor 20 can be reversed by the operator to rotate threaded rods 48 and 50 in the opposite direction and thereby withdraw pusher mechanism 54 to the position shown in FIG. 4 for reloading the truck.

Preferably, the speed of the pusher mechanism is limited to four feet per minute to prevent damage to the pallets 56 and cargo thereon. Furthermore, the floor 53a of container 52 is preferably made from a smooth material such as sheet aluminum or steel which will allow the pallets 56 to slide thereover when propelled by pusher mechanism 54.

Although, the preferred embodiments of the invention have been described in detail above, it should be understood that the invention is in no sense limited thereby, and its scope is to be determined by that of the following claims:

What is claimed is:

1. An apparatus for unloading cargo placed on pallets in a cargo container connectable to a motor vehicle, said cargo container having at least two parallel vertical sidewalls connected to a smooth, flat horizontal floor which will allow said pallets to slide thereover when pushed, said apparatus comprising:

a. two threaded rods, one of said threaded rods being adapted to be rotatably connected to the bottom of one of said vertical sidewalls adjacent to said floor, and the other of said two threaded rods being adapted to be rotatably connected to the bottom of the other of said two vertical sidewalls adjacent to said floor, said rods extending substantially the full length of said walls of said cargo container, a first casing enclosing the second of said two threaded rods and a second casing enclosing the second of said two threaded rods, each of said casings being parallel and adapted to be connected to the bottom of one of said sidewalls of said cargo container, each of said casings having an elongated channel therein, each of said elongated channels being oriented inward toward the other channel, b. an electric motor connected to said threaded rods to selectively rotate said threaded rods, said electric motor being located inside said cargo container, said electric motor and one end of each of said threaded rods being connected to a rigid plate, said electric motor having a drive shaft which drives a plurality of gears connected to said rigid plate for rotating each of said threaded rods, each of said threaded rods having a drive chain connected to a sprocket on each of said threaded rods, and c. a pusher mechanism rotatably connected to each of said rods and extending between each of said rods, said pusher mechanism having a single vertical rectangular plate for contacting said pallets contained in said cargo container to force said pallets out of said cargo container as said threaded rods are rotated, said rectangular plate having a bottom edge adjacent to the bottom of said casings and a top edge adjacent to the top of said casings, said pusher mechanism being located inside said cargo container, said rectangular plate having a longitudinal bar connected to one side thereof having two ends, each end of said longitudinal bar being slidably received in one of said elongated channels in said casings, said longitudinal bar having an internally threaded cylinder connected at each end thereof for rotatable receipt of each of said threaded rods, each of said internally threaded cylinders being slidably received in one of said channels.

2. The apparatus of claim 1 wherein said cargo container is a trailer.

3. The apparatus of claim 2 wherein said cargo container is a cargo container rigidly connected to a truck.

4. The apparatus of claim 2 wherein each of said casings has a height about equal to the height of a pallet.

* * * * *